(12) United States Patent
Schel

(10) Patent No.: US 6,776,269 B1
(45) Date of Patent: Aug. 17, 2004

(54) TWIN PISTON SHOCK ABSORBER

(75) Inventor: Sjaak Schel, Overasselt (NL)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 30 days.

(21) Appl. No.: 10/464,192

(22) Filed: Jun. 18, 2003

(51) Int. Cl.$^7$ ................................................. F16F 9/48
(52) U.S. Cl. ...................... 188/287; 188/284; 188/316; 188/318
(58) Field of Search ................................. 188/284, 286, 188/287, 304, 316, 317, 322.17, 318, 288; 16/56; 92/60, 62; 277/434, 436, 459; 267/195, 217

(56) References Cited

U.S. PATENT DOCUMENTS

| | | | |
|---|---|---|---|
| 396,108 A | * | 1/1889 | Nickerson .................... 188/318 |
| 1,141,310 A | * | 6/1915 | Bradburn ..................... 188/288 |
| 1,183,281 A | * | 5/1916 | Derihon ....................... 188/317 |
| 1,567,515 A | | 12/1925 | Kijima et al. |
| 3,024,874 A | * | 3/1962 | De Koning et al. ........ 188/286 |
| 4,066,279 A | | 1/1978 | Kaptanis |
| 4,298,101 A | | 11/1981 | Dressell, Jr. et al. |
| 4,433,759 A | | 2/1984 | Ichinose |
| 4,671,392 A | | 6/1987 | Wossner |
| 4,819,770 A | | 4/1989 | Hahn |
| 5,157,806 A | | 10/1992 | Wartian |
| 5,228,640 A | | 7/1993 | Mouille |
| 5,376,135 A | | 12/1994 | Aulie |
| 5,398,786 A | * | 3/1995 | Mintgen ...................... 188/284 |
| 5,797,593 A | | 8/1998 | Oyaizu |
| 5,799,759 A | | 9/1998 | Koch |
| 5,810,128 A | | 9/1998 | Eriksson et al. |
| 5,971,117 A | | 10/1999 | Grundei et al. ............. 188/288 |

FOREIGN PATENT DOCUMENTS

JP 61136030 A * 6/1986 ............. F16F/9/02

* cited by examiner

*Primary Examiner*—Thomas Williams
(74) *Attorney, Agent, or Firm*—Harness, Dickey & Pierce, PLC

(57) ABSTRACT

A two-stage piston has a twin piston design where one piston produces a high damping force and the second piston produces a low damping force. At specified positions along the pressure tube, by-pass passages are formed to allow fluid flow around the high damping force piston to provide a low damping force or a soft ride. In the areas of the pressure tube where there are no by-pass passages, the high damping force piston provides a high damping force or a firm ride. In the area of the pressure tube where there are no by-pass passages, the high damping force piston and the low damping force piston both contribute to the high damping force.

16 Claims, 4 Drawing Sheets

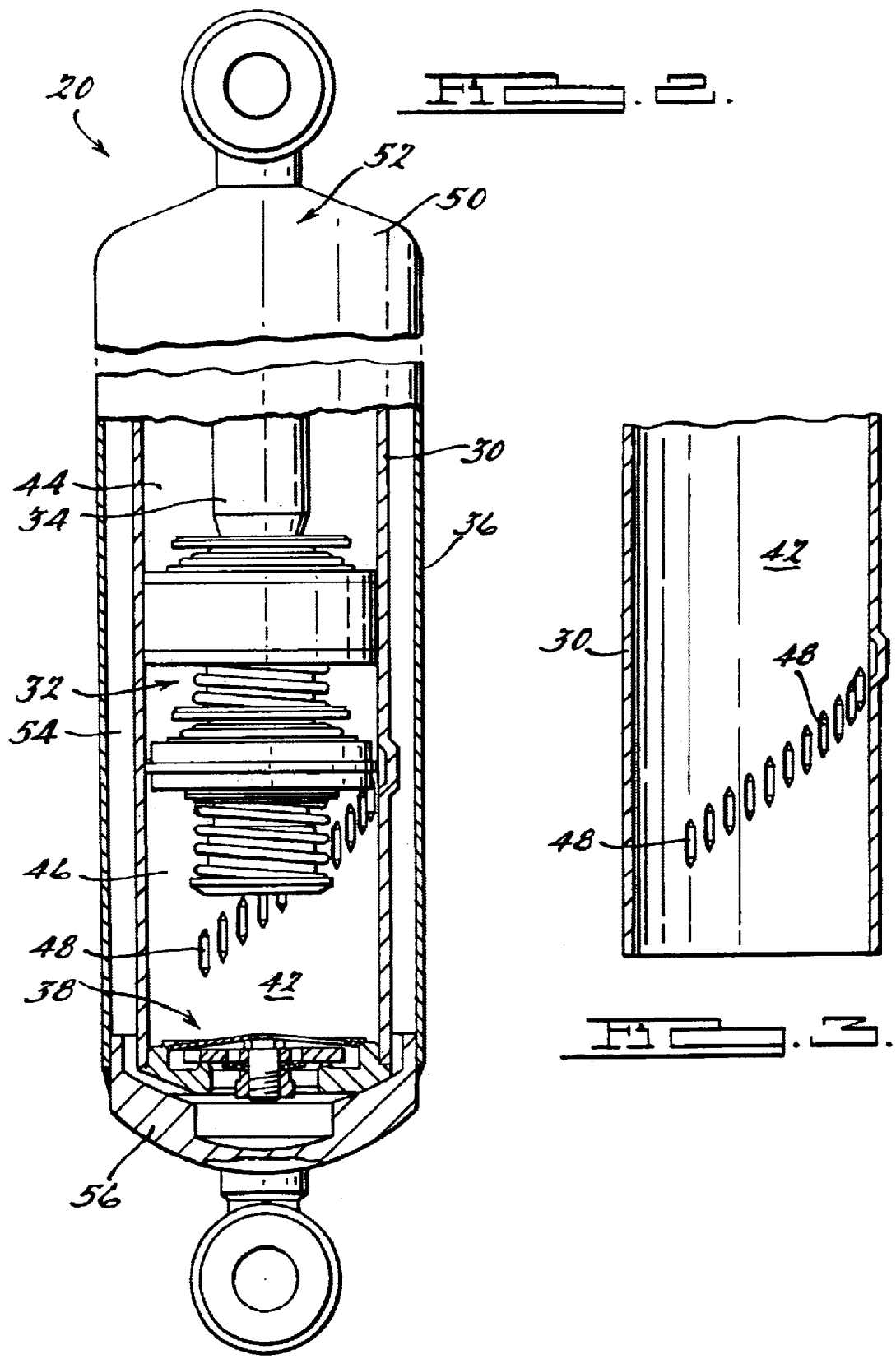

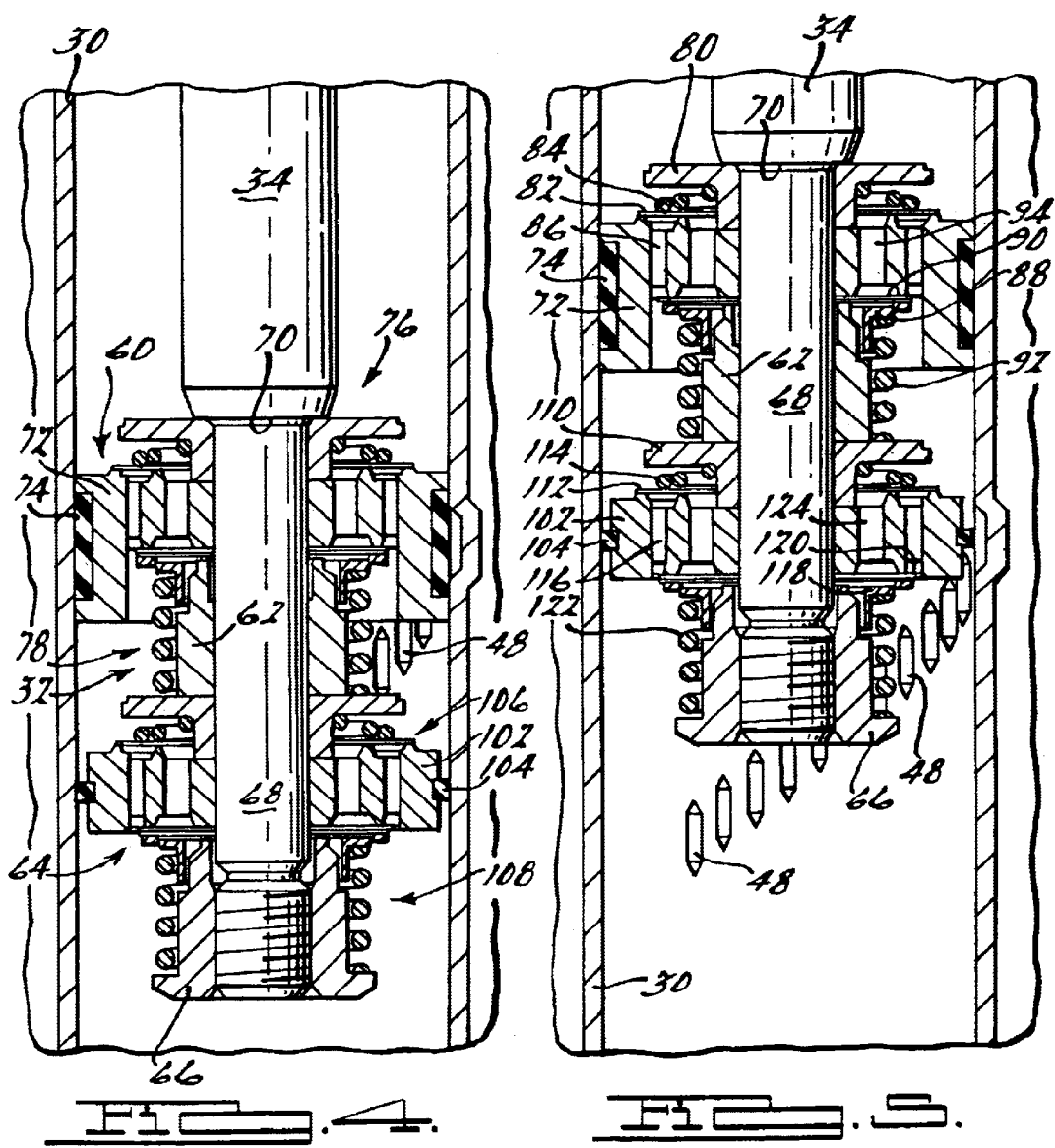

TWIN PISTON SHOCK ABSORBER

FIELD OF THE INVENTION

The present invention relates to a hydraulic damper or shock absorber for use in a suspension system such as the suspension systems used for automotive cars and trucks. More particularly, the present invention relates to a hydraulic damper or shock absorber which has a two-stage damping characteristic where a relatively low level damping is provided over a specified portion of the stroke of the hydraulic damper or shock absorber and a relatively high level of damping is provided outside of the specified portion of the stroke of the hydraulic damper or shock absorber.

BACKGROUND OF THE INVENTION

A conventional prior art mono-tube hydraulic damper or shock absorber comprises a cylinder defining a working chamber having a piston slidably engaging the cylinder within the working chamber. The piston thus divides the working chamber into an upper working chamber and a lower working chamber. A piston rod is connected to the piston and it extends out through one end of the cylinder. A first valving system is incorporated into the piston for generating a damping force during the extension stroke of the piston and a second valving system is incorporated into the piston for generating a damping force during the compression stroke of the piston. In a dual tube hydraulic damper or shock absorber, a reservoir tube surrounds the pressure tube to define a reserve chamber. A base valve assembly controls fluid flow between the working chamber and the reserve chamber. A first valving system is incorporated into the piston for generating a damping force during the extension stroke and a second valving system is incorporated into the base valve assembly for generating a damping force during the compression stroke of the piston. The piston includes a valve system to regulate the pressure drop across the piston for fluid flow during the compression stroke and the base valve assembly includes a check valve for fluid flow during the extension stroke.

Various types of damping force generating devices have been developed to generate a variety of desired damping forces in relation to various operating characteristics such as the speed and/or the displacement of the piston within the cylinder. These multi-force damping force generating devices have been developed to provide a relatively small or low damping force during the normal running of the vehicle and a relatively large or high damping force during maneuvers requiring extensions or large suspension movements. The normal running of the vehicle is accompanied by relatively small or fine vibrations of the unsprung mass of the vehicle and thus, the need for a soft ride or low damping characteristic of the suspension system to isolate the sprung mass from these vibrations. During a turning or braking maneuver, as an example, the sprung mass of the vehicle will attempt to undergo a relatively slow and/or large vibration which then requires a firm ride or high damping characteristics of the suspension system to support the sprung mass and provide a stable handling characteristic for the vehicle. Thus, these multi-force damping force generating devices offer the advantage of a smooth steady ride by eliminating the transmission of the high frequency/small amplitude vibrations between the unsprung mass and the sprung mass while still providing the necessary high damping or firm ride for the suspension during vehicle maneuvers causing larger excitations of the sprung mass to provide stability to the sprung mass.

The continued development of hydraulic dampers includes the development of multi-force damping force generating devices which are simpler to manufacture, can be manufactured at a lower cost and which improve the desired force generating characteristics.

SUMMARY OF THE INVENTION

The present invention provides the art with a multi-stage hydraulic damper or shock absorber that provides different levels of damping based upon the position of the piston with respect to the pressure tube of the damper. The multi-stage damping is provided by the incorporation of twin pistons and the incorporation of a plurality of by-pass notches formed into the pressure tube wall. The plurality of notches allow fluid flow around one of the two pistons but not around both of them. Thus, when the by-passed piston is in engagement with one or more of the bypass notches, a relatively low damping force is generated. When the by-passed piston is not in engagement with any of the by-pass notches, a relatively high damping force is generated. By appropriately positioning the plurality of by-pass notches within the pressure tube, a relatively low damping force can be generated at typical vehicle heights while still allowing the hydraulic damper or shock absorber to generate a relatively high damping force when the shock absorber travels outside the typical vehicle height.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross-sectional side view of a dual tube shock absorber incorporating the multi-force damping force generating device in accordance with the present invention;

FIG. 3 is an enlarged cross-sectional view of the pressure tube illustrated in FIG. 2;

FIG. 4 is an enlarged cross-sectional view illustrating the fluid flow with respect to one of the two pistons illustrated in FIG. 2;

FIG. 6 is a cross-sectional side view of a mono-tube shock absorber incorporating the multi-force damping force generating device in accordance with the present invention.

DETAILED DESCRIPTION OF THE PREFERRED EMBODIMENTS

Figure 1:
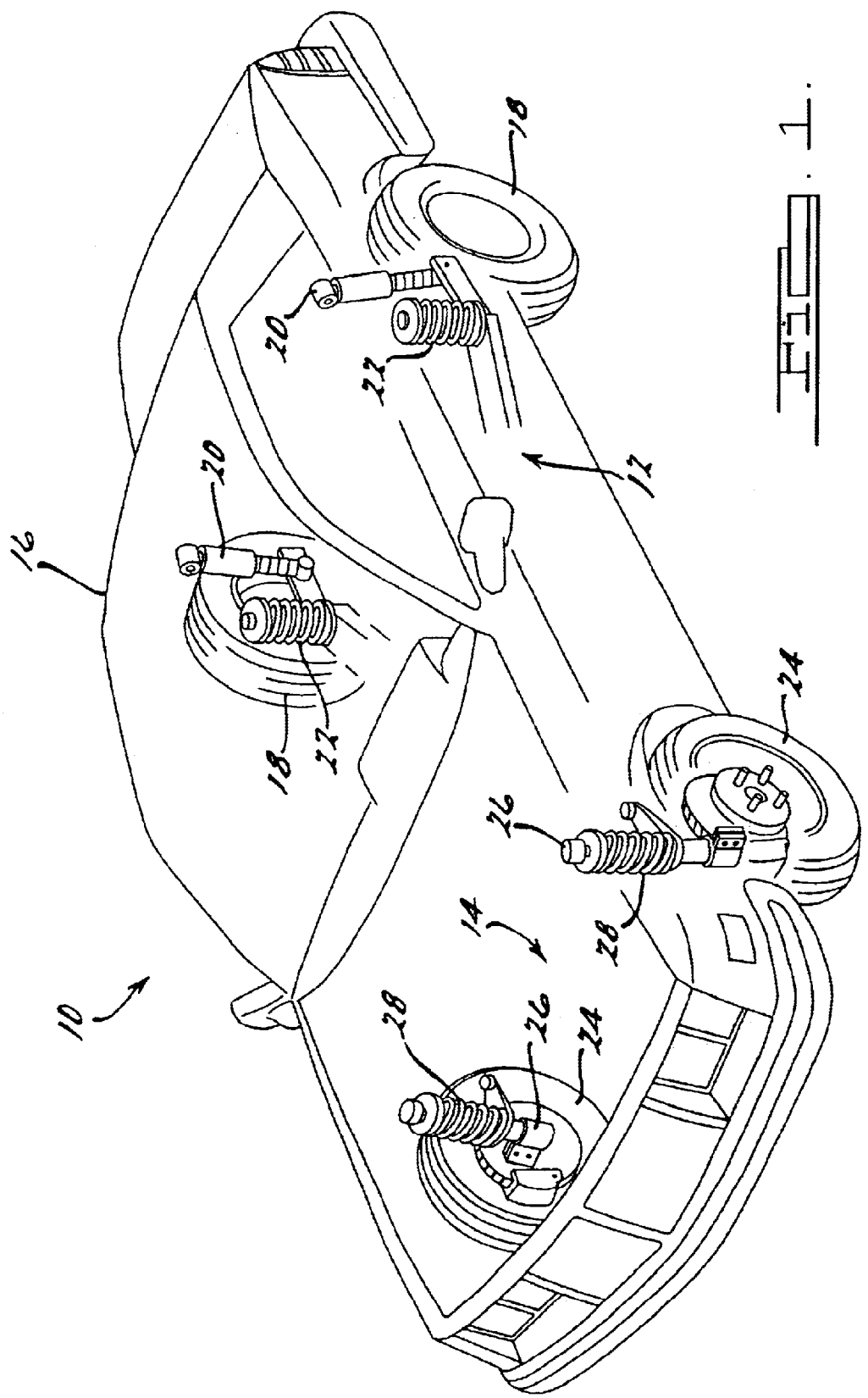
FIG. 1 is an illustration of an automobile using shock absorbers incorporating the multi-force damping force generating device in accordance with the present invention.

The following description of the preferred embodiment(s) is merely exemplary in nature and is in no way intended to limit the invention, its application, or uses. Referring now to the drawings in which like reference numerals designate like or corresponding parts throughout the several views, there is shown in FIG. 1, a vehicle incorporating a suspension having shock absorbers which include the multi-force damping force generating device in accordance with the present invention and which is designated generally by the reference numeral 10. Vehicle 10 includes a rear suspension 12, a front suspension 14 and a body 16. Rear suspension 12 includes a rear axle assembly (not shown) adapted to operatively support a pair of rear wheels 18. The rear axle assembly is operatively connected to body 16 by means of a pair of rear shock absorbers 20 and a pair of rear helical coil springs 22. Similarly, front suspension 14 includes a front axle assembly (not shown) adapted to operatively support a pair of front wheels 24. The front axle assembly is operatively connected to body 16 by a pair of front shock absorbers 26 and by a pair of front helical coil springs 28. Shock absorbers 20 and 26 serve to dampen the relative motion of the unsprung portion (i.e., front and rear suspensions 12 and 14, respectively) from the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent or non-independent front and rear suspension assemblies. Further, the term "shock absorber" as used herein is meant to refer to dampers in general and thus will include McPherson struts.

Referring now to FIG. 2, rear shock absorber 20 is shown in greater detail. While FIG. 2 shows only rear shock absorber 20, it is to be understood that front shock absorber 26 also includes the multi-force damping force generating device in accordance with the present invention which is described below for rear shock absorber 20. Front shock absorber 26 only differs from rear shock absorber 20 in the way in which it is adapted to be connected to the sprung and the unsprung portions of vehicle 10. Shock absorber 20 comprises a pressure tube 30, a piston assembly 32, a piston rod 34, a reservoir tube 36 and a base valve assembly 38.

Pressure tube 30 defines a working chamber 42. Piston assembly 32 is slidably disposed within pressure tube 30 and it divides working chamber 42 into an upper working chamber 44 and a lower working chamber 46. Pressure tube 30 defines a plurality of by-pass indentations 48 that are formed into pressure tube 30 for example in a spiral formation as shown in FIGS. 2 and 3. By-pass indentations are specifically located along the length of pressure tube 30 to define an area of relatively low damping force generating for a soft ride as is discussed in detail below.

Piston rod 34 is attached to piston assembly 32 and it extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston assembly 32 is adapted, in the preferred embodiment, to be secured to the sprung portion of vehicle 10. Valving within piston assembly 32 creates a damping force by controlling the movement of fluid between upper working chamber 44 and lower working chamber 46 during an extension stroke of piston assembly 32 with respect to pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 from the amount of fluid displaced in lower working chamber 46. This difference in the amount of fluid displaced is known as the "rod volume" and it flows through base valve assembly 38. Valving in base valve assembly 38 creates a damping force by controlling the movement of fluid between lower working chamber 46 and a reservoir chamber 54 defined between pressure tube 30 and reservoir tube 36 during a compression stroke of piston assembly 32 with respect to pressure tube 30. While shock absorber 20 is being illustrated as a dual tube shock absorber having base valve assembly 38, it is within the scope of the present invention to utilize pressure tube 30 and piston assembly 32 in a mono-tube designed shock absorber as shown in FIG. 6 and detailed below.

Reservoir tube 36 surrounds pressure tube 30 to define reserve chamber 54 located between tubes 30 and 36. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base valve assembly 38 is disposed between lower working chamber 46 and reservoir chamber 54 to control the flow of fluid between the two chambers. When shock absorber 20 extends in length (extension or rebound), an additional volume of fluid is needed in lower working chamber 46 due to the "rod volume" concept. Thus, fluid will flow from reservoir chamber 54 to lower working chamber 46 through base valve assembly 38. This fluid flow will not create a damping force. The damping force in an extension stroke is created by valving in piston assembly 32. When shock absorber 20 compresses in length (compression), replacement fluid for upper working chamber 44 flows through piston assembly 32. This fluid flow does not create a damping force. An excess amount of fluid must be removed from lower working chamber 46 due to the "rod volume" concept. Thus, fluid flow will flow from lower working chamber. 46 to reservoir chamber 54 through valving in base valve assembly 38 to create a damping force during the compression stroke.

The present invention is directed to a unique piston assembly 32 which works in conjunction with pressure tube 30 and its by-pass passages 48 to provide a multi-force damping force device which alters the size of the damping force generated based upon the position of the piston with respect to pressure tube 30 and by-pass notches 48.

Figure 5:
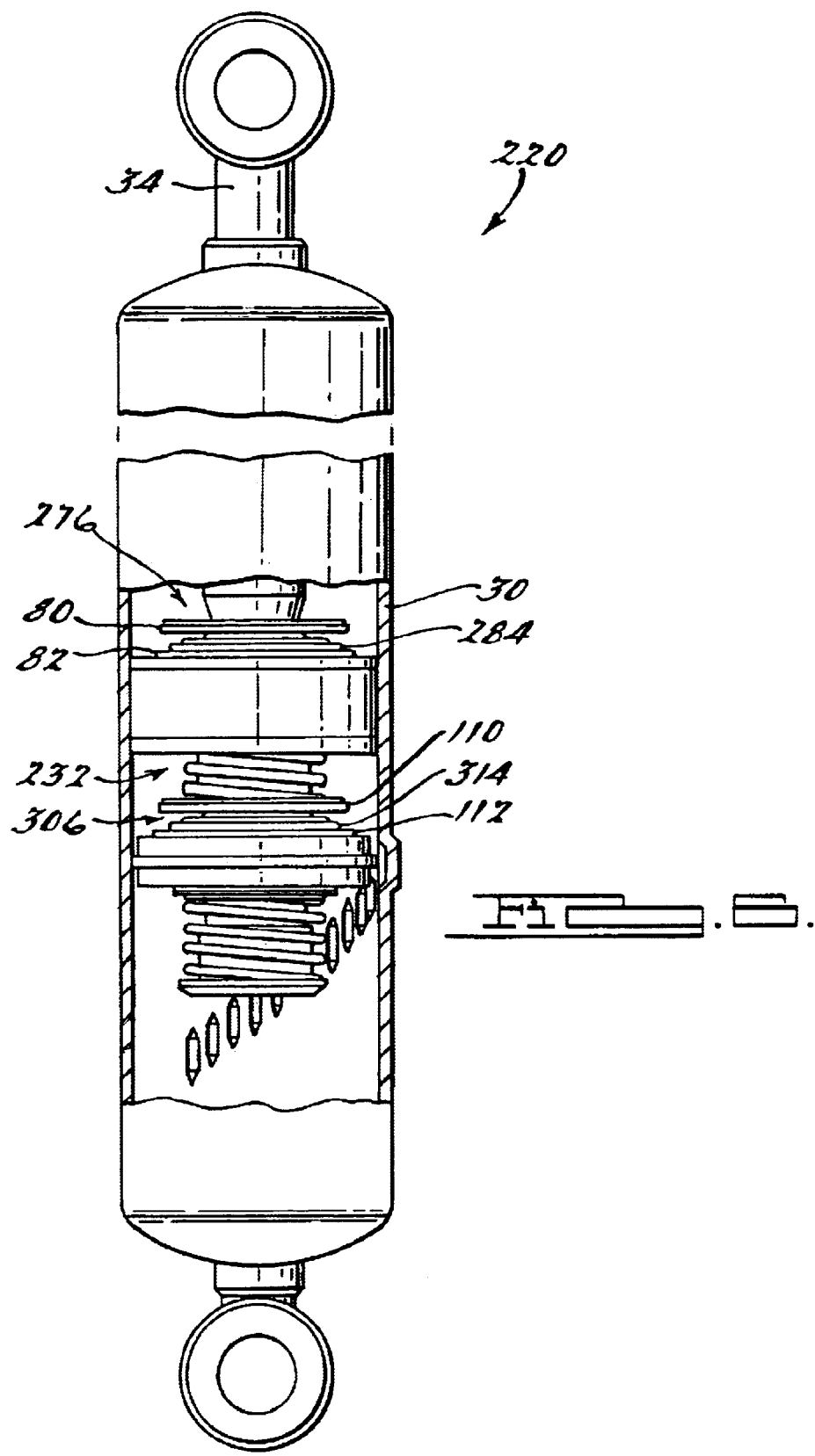
FIG. 5 is an enlarged cross-sectional view illustrating the fluid flow with respect to the other of the two pistons illustrated in FIG. 2.

Referring now to FIGS. 2, 4 and 5, piston assembly 32 comprises a low force piston assembly 60, a spacer 62, a high force piston assembly 64 and a retaining nut 66. Piston rod 34 defines a reduced diameter section 68 which defines a shoulder 70. Lower force piston assembly 60 is disposed adjacent shoulder 70, spacer 62 is disposed adjacent lower force piston assembly 60 and high force piston assembly 64 is disposed adjacent spacer 62 as shown in FIG. 2. Retaining nut 66 is threadingly received by piston rod 34 to secure low force piston assembly 60, spacer 62 and high force piston assembly 64 to piston rod 34.

Low force piston assembly 60 comprises a piston body 72, a seal 74 (the seal-function can optionally be performed by the piston body), a compression valve assembly 76 and an extension valve assembly 78. Piston body 72 is slidingly received within pressure tube 30 with seal 74 being disposed between piston body 72 and pressure tube 30. Seal 74 permits sliding movement of piston body 72 with respect to pressure tube 30 without generating undue frictional forces as well as sealing upper working chamber 44 from lower working chamber 46. Compression valve assembly 76 comprises a spring seat 80, a valve plate 82 and a biasing member or spring 84. Spring seat 80 abuts shoulder 70. Valve plate 82 abuts piston body 72 to control fluid flow through a plurality of compression passages 86 extending through piston body 72. Biasing member 84 is disposed between spring seat 80 and valve plate 82 to bias valve plate 82 against piston body 72 to close compression passages 86. During a compression stroke, fluid pressure builds up in compression passages 86 until the load exerted by biasing member 84 is overcome. This lifts valve plate 82 from piston body 72 to allow fluid flow through passages 86. The strength of biasing member 84 is chosen to generate a relatively low damping load during a compression stroke. During a compression stroke, base valve assembly 38 generates the damping force. Extension valve assembly 78 comprises a spring seat 88, a valve plate 90 and a biasing member or spring 92. Valve plate 90 abuts piston body 72 to control fluid flow through a plurality of extension passages 94 extending through piston body 72. Biasing member 92 is disposed between high force piston assembly 64 and spring seat 88 to bias spring seat 88 against valve plate 90 and thus, valve plate 90 against piston body 72 to close compression passages 94. During an extension stroke, fluid pressure builds up in extension passages 94 until the load exerted by biasing member 92 is overcome. This lifts valve plate 90 from piston body 72 to allow fluid flow through passages 94. The strength of biasing member 92 is chosen to provide a relatively low damping force characteristic or a soft ride characteristic for shock absorber 20 during the extension stroke. Extension valve assembly 78 also prohibits fluid flow through passages 94 during a compression stroke of shock absorber 20.

High force piston assembly 64 comprises a piston body 102, a seal 104, a compression valve assembly 106 and an extension valve assembly 108. Piston body 102 is slidingly received within pressure tube 30 with seal 104 being disposed between piston body 102 and pressure tube 30. Seal 104 permits sliding movement of piston body 102 with respect to pressure tube 30 without generating undue frictional forces as well as sealing upper working chamber 44 from lower working chamber 46. Compression valve assembly 106 comprises a spring seat 110, a valve plate 112 and a biasing member or spring 114. Spring seat 110 abuts spacer 62. Valve plate 112 abuts piston body 102 to control fluid flow through a plurality of compression passages 116 extending through piston body 102. Biasing member 114 is disposed between spring seat 110 and valve plate 112 to bias valve plate 112 against piston body 102 to close compression passages 116. During a compression stroke, fluid pressure builds up in compression passages 116 until the load exerted by biasing member 114 is overcome. This lifts valve plate 112 from piston body 102 to allow fluid flow through passages 116. The strength of biasing member 114 is chosen to provide a relatively high damping force during the compression stroke. Compression valve assembly 106 is designed to prohibit fluid flow through passages 116 during an extension stroke. During a compression stroke, base valve assembly 38 generates the damping force. Extension valve assembly 108 comprises a spring seat 118, a valve plate 120 and a biasing member or spring 122. Valve plate 120 abuts piston body 102 to control fluid flow through a plurality of extension passages 124 extending through piston body 102. Biasing member 122 is disposed between retaining nut 66 and spring seat 118 to bias spring seat 118 against valve plate 120 and thus valve plate 120 against piston body 102 to close compression passages 124. During an extension stroke, fluid pressure builds up in extension passages 124 until the load exerted by biasing member 122 is overcome. This lifts valve plate 120 from piston body 102 to allow fluid flow through passages 124. The strength of biasing member 122 is chosen to provide a relatively high damping force characteristic or a firm ride characteristic for shock absorber 20 during the extension stroke. Extension valve assembly 108 also prohibits fluid flow through passages 124 during a compression stroke of shock absorber 20.

FIG. 4 illustrates the relationship between low force piston assembly 60 and the plurality of by-pass indentations 48. Seal 74 is designed to be axially longer than the axial length of each individual indentation 48. Thus, when low force piston assembly 60 moves over the plurality of by-pass indentations 48, there is no change to the fluid flow with respect to low force piston assembly 60.

FIG. 5 illustrates the relationship between high force piston assembly 64 and the plurality of by-pass indentations 48. Seal 104 is designed to be axially shorter than the axial length of each individual indentation 48. Thus, when high force piston assembly 64 moves over the plurality of by-pass indentations 48, fluid flow by-passes high force piston assembly 64 to remove the effect of extension valve assembly 108 and compression valve assembly 106. The travel of high force piston assembly 64 within the area of the plurality of by-pass indentations 48 essentially converts the twin piston design into a single piston design by allowing the fluid flow to by-pass piston assembly 64 but not bypass low force piston assembly 60.

During an extension stroke of shock absorber 20, with high force piston assembly 64 being located within the area of indentations 48 as shown in FIG. 5, the damping force is created only by extension valve assembly 76 of low force piston assembly 60. Because biasing member 92 is designed to provide a relatively low damping force, shock absorber 20 provides a soft ride. The effect of high force piston assembly 64 is negated by the plurality of indentations 48 which allow fluid flow around high force piston assembly 64. When high force piston assembly 64 moves into an area of pressure tube 30 which does not include the plurality of indentations 48 as shown in FIG. 4, the flow of fluid around piston assembly 64 is prohibited. The damping force for shock absorber 20 is created by extension valve assembly 78 and extension valve assembly 108 in series. Because biasing member 122 of extension valve assembly 108 is designed to provide a relatively high damping force, shock absorber 20 will provide a firm ride.

During a compression stroke of shock absorber 20, with high force piston assembly 64 being located within the area of indentations 48 as shown in FIG. 5, the damping force is created only by compression valve assembly 76 of low force piston assembly 60. Because biasing member 84 is designed to provide a relatively low damping force, shock absorber 20 provides a soft ride. The effect of high force piston assembly 64 is negated by the plural indentations 48 which allow fluid flow around high force piston assembly 64. When high force piston assembly 64 moves into an area of pressure tube 30 which does not include the plurality of indentations 48 as shown in FIG. 4, the flow around piston assembly 64 is prohibited. The damping force for shock absorber 20 is created by compression valve assembly 76 and compression valve assembly 106 in series. Because biasing member 114 on compression valve assembly 106 is designed to provide a relatively high damping force, shock absorber 20 will provide a firm ride.

Referring now to FIG. 6, a rear shock absorber 220 according to another embodiment of the present invention is illustrated. Similar to shock absorber 20, shock absorber 220 can replace either rear shock absorber 20 or front shock absorber 26. Shock absorber 220 comprises pressure tube 30, a piston assembly 232 and piston rod 34.

Piston assembly 232 is the same as piston assembly 32 except that compression valve assembly 276 replaces compression valve assembly 76 and compression valve assembly 306 replaces compression valve assembly 106. Compression valve assembly 276 comprises spring seat 80, valve plate 82 and a biasing member or spring 284. Compression valve assembly 276 and biasing member 284 are incorporated to provide the damping force during the compression stroke. Compression valve assembly 306 comprises spring seat 110, valve plate 112 and biasing member or spring 314. Compression valve assembly 306 and biasing member 314 are incorporated to provide the damping force during the compression stroke. Thus, a two level damping force is generated by compression valve assembly 276 and compression valve assembly 306 in a similar manner to that described above for extension valve assembly 78 and extension valve assembly 108, respectively.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A two-stage shock absorber comprising:
   a pressure tube defining a chamber, said pressure tube having a wall defining a by-pass passage open to said chamber, said by-pass passage extending over a first length in an axial direction of said tube;
   a first piston slidably disposed within said chamber;
   a first seal disposed between said first piston and said wall of said pressure tube, said first seal extending over a second length in said axial direction of said tube, said second length being greater than said first length;
   a second piston slidably disposed within said chamber;
   a second seal disposed between said second piston and said wall of said pressure tube, said second seal extending over a third length in said axial direction of said tube, said third length being less than said first length; and
   a piston rod attached to said first and second pistons.

2. The two-stage shock absorber described in claim 1, wherein said first piston defines a first compression passage and said shock absorber further comprising a first compression valve assembly attached to said first piston for controlling fluid flow through said first compression passage.

3. The two-stage shock absorber described in claim 2, wherein said second piston defines a second compression passage and said shock absorber further comprising a second compression valve assembly attached to said second piston for controlling fluid flow through said second compression passage.

4. The two-stage shock absorber described in claim 1, wherein said second piston defines a compression passage and said shock absorber further comprises a compression valve assembly attached to said second piston for controlling fluid flow through said compression passage.

5. The two-stage shock absorber described in claim 1, wherein said first piston defines a first extension passage and said shock absorber further comprising a first extension valve assembly attached to said first piston for controlling fluid flow through said first extension passage.

6. The two-stage shock absorber described in claim 5, wherein said second piston defines a second extension passage and said shock absorber further comprising a second extension valve assembly attached to said second piston for controlling fluid flow through said second extension passage.

7. The two-stage shock absorber described in claim 1, wherein said second piston defines an extension passage and said shock absorber further comprises an extension valve assembly attached to said second piston for controlling fluid flow through said extension passage.

8. The two-stage shock absorber described in claim 1 further comprising a plurality of by-pass passages.

9. The two-stage shock absorber described in claim 1 wherein said shock absorber further comprises:
   a reservoir tube surrounding said pressure tube; and
   a base valve assembly disposed between said pressure tube and said reservoir tube.

10. The two-stage shock absorber described in claim 9, wherein said first piston defines a first compression passage and said shock absorber further comprising a first compression valve assembly attached to said first piston for controlling fluid flow through said first compression passage.

11. The two-stage shock absorber described in claim 10, wherein said second piston defines a second compression passage and said shock absorber further comprising a second compression valve assembly attached to said second piston for controlling fluid flow through said second compression passage.

12. The two-stage shock absorber described in claim 9, wherein said second piston defines a compression passage and said shock absorber further comprises a compression valve assembly attached to said second piston for controlling fluid flow through said compression passage.

13. The two-stage shock absorber described in claim 9, wherein said first piston defines a first extension passage and said shock absorber further comprising a first extension valve assembly attached to said first piston for controlling fluid flow through said first extension passage.

14. The two-stage shock absorber described in claim 13, wherein said second piston defines a second extension passage and said shock absorber further comprising a second extension valve assembly attached to said second piston for controlling fluid flow through said second extension passage.

15. The two-stage shock absorber described in claim 9, wherein said second piston defines an extension passage and said shock absorber further comprises an extension valve assembly attached to said second piston for controlling fluid flow through said extension passage.

16. The two-stage shock absorber described in claim 9 further comprising a plurality of by-pass passages.

* * * * *